United States Patent Office 3,280,133
Patented Oct. 18, 1966

3,280,133
(OPTIONALLY ALKYLATED)-2-AZA-5α-ANDROSTAN-17β-OLS AND ACYL DERIVATIVES THEREOF
Raphael Pappo, Skokie, and Christopher Jung, Morton Grove, Ill., assignors to G. D. Searle & Co., Chicago, Ill., a corporation of Delaware
No Drawing. Filed Oct. 12, 1964, Ser. No. 403,379
12 Claims. (Cl. 260—289)

The present invention is concerned with novel steroidal heterocyclic amines and, more particularly, with (optionally alkylated)-2-aza-5α-androstan-17β-ols and acyl derivatives corresponding which are encompassed by the following structural formula

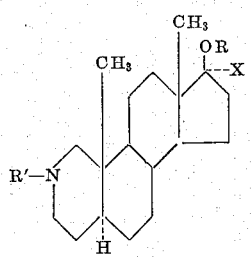

wherein R can be hydrogen or a lower alkanoyl radial, R' is hydrogen or a lower alkyl or lower alkanoyl radical, and X is hydrogen or a lower alkyl radical.

The term "lower alkyl" includes those radicals of the formula $$C_nH_{2n+1}$$

wherein $n$ is a positive integer less than 7, and is exemplified by methyl, ethyl, propyl, butyl, pentyl, hexyl, and the branched-chain radicals isomeric therewith. The lower alkanoyl radicals are represented by the formula

—C—(lower alkyl)

wherein the term "lower alkyl" is as hereinbefore defined.

The instant compounds can be obtained by utilizing as starting materials compounds of the following structural formula

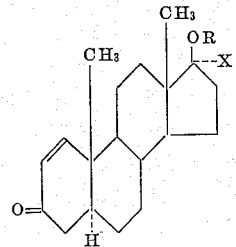

wherein R and X have the identical meanings as described above. Cleavage of the 1,2-unsaturated linkage of those materials, typically by ozonolysis, affords the corresponding 1-oxo-1,2-seco-A-nor-5α-androstan-2-oic acids which can be represented by the structural formula

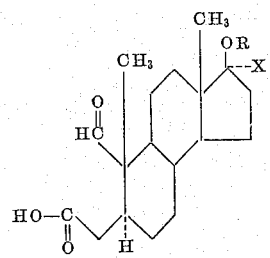

Reductive amination of those intermediates affords the corresponding A-ring lactams characterized by the structural formula

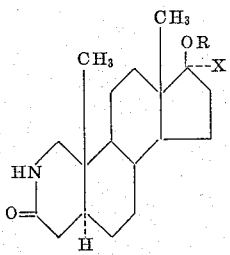

These lactams can be converted to the instant amines by reaction with a suitable reducing agent. As a specific example of the latter processes, 17β-acetoxy-5α-androst-1-en-3-one in methylene chloride containing methanol is ozonized at about −70°; and the resulting ozonide is decomposed in the presence of aqueous sodium hydroxide to afford 17β-acetoxy-1-oxo-1,2-seco-A-nor-5α-androstan-2-oic acid; that seco compound together with a suitable hydrogenation catalyst such as Raney nickel is shaken with hydrogen at about 2000 pounds per square inch pressure and at a temperature of about 100° in methanol containing concentrated ammonium hydroxide to yield 2-aza-17β-hydroxy-5α-androstan-3-one; and that lactam is reduced with lithium aluminum hydride in dioxane to yield the instant 2-aza-5α-androstan-17β-ol.

The instant tertiary amines are conveniently produced by reduction of the corresponding N-alkylated lactams or, alternatively, by alkylation of the aforementioned secondary amine derivatives. Thus, 2-aza-17β-hydroxy-2-methyl-5α-androstan-3-one is reduced with lithium aluminum hydride in dioxane to yield 2-aza-2-methyl-5α-androstan-17β-ol.

Acylation of the instant amines with a lower alkanoic acid anhydride or halide, preferably in the presence of a suitable acid acceptor, affords the corresponding lower alkanoyl derivatives. Reaction of 2-aza-17α-methyl-5α-androstan-17β-ol with acetic anhydride and pyridine thus affords 2-acetyl-2-aza-17α-methyl-5α-androstan-17β-ol while acetylation of 2-aza-5α-androstan-17β-ol by that method results in 2-acetyl-2-aza-5α-androstan-17β-ol 17-acetate.

The compounds of the present invention exhibit valuable pharmacological properties. They are hormonal agents, for example, as evidenced by their anabolic and androgenic activity. In addition, they are anti-bacterial, anti-protozoal, anti-algal, and anti-fungal agents in view of their ability to inhibit the growth of such organisms as *Diplococcus pneumoniae*, *Tetrahymena gelleii*, *Chlorella vulgaris*, *Trichophyton mentagrophytes*, and *Candida albicans*. They similarly possess the ability to inhibit the growth of dicotyledonous seed germination.

The following examples describe in detail certain of the compounds illustrative of the present invention together with methods which have been devised for their manufacture. However, the invention is not to be construed as limited thereby either in spirit or in scope since it will be apparent to those skilled in the art that many modifications both of materials and methods may be practiced without departing from the purpose and intent of this disclosure. In the examples hereinafter detailed, temperatures are given in degrees centigrade (° C.) and quantities of materials are in parts by weight except as otherwise noted.

*Example 1*

A mixture of 20 parts of 17β-acetoxy-5α-androst-1-en-3-one in 134 parts of methylene chloride containing 160 parts of methanol is cooled to about −70°, and a stream of oxygen containing 6–8% of ozone is bubbled through the mixture until a blue color persists. The ozone addition requires about 30 minutes. The reaction mixture is then purged of excess oxidant by means of a stream of nitrogen, and a solution of 6 parts of sodium hydroxide in 75 parts of water is added. The resulting aqueous mixture is washed with methylene chloride, then is acidified with concentrated hydrochloric acid. The acidic mixture is extracted with methylene chloride, and the organic layer is washed successively with water and saturated aqueous sodium chloride and is dried over anhydrous sodium sulfate, then stripped of solvent at reduced pressure to afford a residual solid of 17β-acetoxy-1-oxo-1,2-seco-A-nor-5α-androstan-2-oic acid.

*Example 2*

To a solution of 10 parts of 17β-acetoxy-1-oxo-1,2-seco-A-nor-5α-androstan-2-oic acid in 133 parts by volume of concentrated aqueous ammonium hydroxide containing 67 parts by volume of methyl alcohol is added 9 parts of Raney nickel, and the resulting reaction mixture is shaken in a hydrogen atmosphere at about 100° and about 2000 pounds per square inch pressure for about 16 hours. The mixture is then cooled and filtered, and the filter cake is washed with concentrated aqueous ammonium hydroxide, then is extracted with boiling isopropyl alcohol. Evaporation of the solvent under reduced pressure affords crude 2-aza-17β-hydroxy-5α-androstan-3-one. Recrystallization from ethanol affords a pure sample which melts at about 265–270°.

*Example 3*

To a solution of 6.36 parts of 17β-hydroxy-17α-methyl-5α-androst-1-en-3-one in 95 parts of acetic acid containing 12 parts of water is added 40 parts of lead tetraacetate and 0.6 part of osmium tetroxide. This mixture is stored at room temperature for about 24 hours, then is treated with 2 parts of lead tetraacetate. Evaporation to dryness at reduced pressure affords a residue which is extracted with benzene. The benzene extract is washed with water and extracted with aqueous potassium bicarbonate. The aqueous extract is washed with ether, acidified with dilute sulfuric acid, then is extracted with ethyl acetate-benzene. This organic extract is washed with water, dried over anhydrous sodium sulfate, and concentrated to dryness in vacuo.

To a solution of the residual crude product in 20 parts of pyridine is added 10 parts of 20% aqueous sodium bisulfite, and the mixture is stirred for about 20 minutes at room temperature. This mixture is then diluted with water, washed with ethyl acetate, acidified with dilute sulfuric acid, and finally extracted with benzene. The benzene extract is washed with water, dried over anhydrous sodium sulfate and evaporated to dryness at reduced pressure to produce crude 17β-hydroxy-17α-methyl-1-oxo-1,2-seco-A-nor-5α-androstan-2-oic acid which, after recrystallization from aqueous isopropyl alcohol, melts at about 166–173° with decomposition.

*Example 4*

To a solution of 30 parts of 17β-hydroxy-17α-methyl-1-oxo-1,2-seco-A-nor-5α-androstan-2-oic acid in 570 parts of a 1:1 mixture of concentrated ammonium hydroxide and water is added 18 parts of Raney nickel catalyst, and that reaction mixture is heated at 90–100° in an atmosphere of hydrogen at about 2400 pounds per square inch pressure for a period of about 16 hours. The mixture is cooled, and the insoluble portion is collected by filtration. This solid material is thoroughly washed with concentrated ammonium hydroxide, then with isopropyl alcohol, and is finally extracted with chloroform. The chloroform extract is filtered to remove insoluble material, then is evaporated to dryness. Recrystallization of the residual solid from chloroform affords pure 2-aza-17β-hydroxy-17α-methyl-5α-androstan-3-one which melts at about 305–307°.

*Example 5*

The substitution of an equivalent quantity of 17α-ethyl-17β-hydroxy-5α-androst-1-en-3-one in the procedure of Example 3 results in 17α-ethyl-17β-hydroxy-1-oxo-1,2-seco-A-nor-5α-androstan-2-oic acid.

*Example 6*

By substituting an equivalent quantity of 17α-ethyl-17β-hydroxy-1-oxo-1,2-seco-A-nor-5α-androstan-2-oic acid and otherwise proceeding according to the processes described in Example 4, 2-aza-17α-ethyl-17β-hydroxy-5α-androstan-3-one is obtained.

*Example 7*

To a solution of 1.26 parts of potassium tertiary-butoxide in 17 parts of tertiary-butyl alcohol is added one part of 2-aza-17β-hydroxy-5α-androstan-3-one, and the resulting mixture is stirred at room temperature for about 5 minutes. At the end of that time, 1.63 parts of methyl iodide is added, and that reaction mixture is heated at the reflux temperature in a nitrogen atmosphere with stirring for about 25 minutes. Approximately 3 parts of water is added, and the solvent is removed by distillation at reduced pressure. The resulting residue is partitioned between water and chloroform, and the organic layer is separated, then washed successively with dilute hydrochloric acid, dilute aqueous potassium bicarbonate and water. Drying over anhydrous sodium sulfate followed by distillation of the solvent at reduced pressure affords the crude product. Crystallization of that substance from benzene yields 2-aza-17β-hydroxy-2-methyl-5α-androstan-3-one, melting at about 204–209°.

*Example 8*

To a solution of 1.89 parts of potassium tertiary-butoxide in 25 parts of tertiary-butyl alcohol is added one part of 2-aza-17β-hydroxy-17α-methyl-5α-androstan-3-one, and that mixture is stirred at room temperature for about 5 minutes, after which time 5.5 parts of methyl iodide is added. The resulting reaction mixture is stirred and heated at the reflux temperature in a nitrogen atmosphere for about 40 minutes, and approximately 3 parts of water is added to the cooled solution. Removal of the solvent by distillation under reduced pressure affords a residue to which is added a mixture of water and chloroform. The layers are separated, and the organic layer is washed successively with cold dilute hydrochloric acid, aqueous potassium bicarbonate and water, then dried over anhydrous sodium sulfate and stripped of solvent at reduced pressure. The resulting crude product is purified by crystallization from benzene, thus affording 2-aza-17β-hydroxy-2,17α-dimethyl-5α-androstan-3-one, melting at about 193.5-201°.

*Example 9*

To a solution of 2.83 parts of potassium tertiary-butoxide in 40 parts of tertiary-butyl alcohol is added 1.5 parts of 2-aza-17β-hydroxy-17α-methyl-5α-androstan-3-one, and that mixture is stirred for about 5 minutes. A quantity of ethyl iodide amounting to 8.2 parts is then added, and the reaction mixture which results is stirred in a nitrogen atmosphere for about 35 minutes at the reflux temperature. Approximately 4 parts of water is then added, and the organic solvent is removed by distillation at reduced pressure. The resulting residue is partitioned between water and chloroform, and the organic layer is separated, washed successively with dilute hydrochloric acid, aqueous potassium bicarbonate and water, then dried over anhydrous sodium sulfate and stripped of solvent by distillation at reduced pressure. The resulting crude product is purified by crystallization from ether-benzene to yield pure 2-aza-2-ethyl-17β-hydroxy-17α-methyl-5α-androstan-3-one, melting at about 178.5–180.5°.

Example 10

By substituting an equivalent quantity of 2-aza-17α-ethyl-17β-hydroxy-5α-androstan-3-one and otherwise proceeding according to the processes described in Example 7, 2-aza-17α-ethyl-17β-hydroxy-2-methyl-5α-androstan-3-one is obtained.

Example 11

By substituting an equivalent quantity of ethyl iodide and otherwise proceeding according to the processes of Example 7, 2-aza-2-ethyl-17β-hydroxy-5α-androstan-3-one is obtained.

Example 12

To a solution of 2 parts of 2-aza-17β-hydroxy-5α-androstan-3-one in 400 parts of dioxane is added 6 parts of lithium aluminum hydride, and the resulting reaction mixture is heated at the reflux temperature, under nitrogen, with stirring for about 24 hours. The reaction mixture is then cooled to 0–5° and is successively diluted with a solution of 6.4 parts of water in 6 parts of dioxane, 4.8 parts by volume of 10% aqueous sodium hydroxide, and 22.4 parts of water. The resulting precipitated inorganic salts are removed by filtration, and the filtrate is stripped of solvent under reduced pressure. The residual solid is dissolved in 21 parts of methanol, and 100 parts by volume of 3% aqueous hydrochloric acid is added. This acidic mixture is extracted with chloroform, then is made alkaline by the addition of aqueous sodium hydroxide. Extraction of the alkaline mixture with benzene affords an organic solution, which is washed with water, dried over anhydrous sodium sulfate, and stripped of solvent under reduced pressure. Recrystallization from benzene affords 2-aza-5α-androstan-17β-ol, melting at about 167–169° and further characterized by the following structural formula

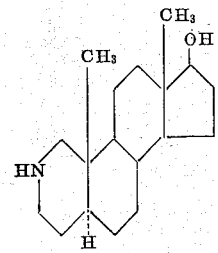

Example 13

A mixture of 1.7 parts of 2-aza-5α-androstan-17β-ol, 20 parts of acetic anhydride and 40 parts of pyridine is kept at room temperature for about 20 hours, then is cooled and diluted with ice. The resulting aqueous mixture is extracted with benzene, and the organic layer is separated, washed successively with dilute hydrochloric acid, aqueous sodium bicarbonate, and water then dried over anhydrous sodium sulfate and concentrated to dryness under reduced pressure. Recrystallization of the resulting residue from cyclohexane affords pure 2-acetyl-2-aza-5α-androstan-17β-ol 17-acetate, melting at about 181.5–184°. This compound is represented by the following structural formula

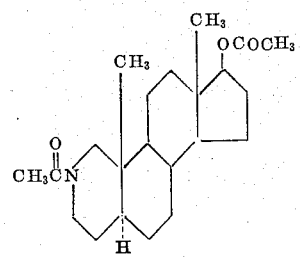

Example 14

The substitution of an equivalent quantity of propionic anhydride in the procedure of Example 13 results in 2-aza-2-propionyl-5α-androstan-17β-ol 17-propionate.

Example 15

To a solution of 5 parts of 2-aza-17β-hydroxy-17α-methyl-5α-androstan-3-one in 1000 parts of dioxane is added 15 parts of lithium aluminum hydride. The resulting reaction mixture is heated at the reflux temperature, in a nitrogen atmosphere, with stirring for about 24 hours, then is stirred at room temperature for an additional 24 hours. The reaction mixture, cooled to 0–5°, is diluted successively with a solution of 16 parts of water in 20 parts of dioxane, 12 parts by volume of 20% aqueous sodium hydroxide, and 56 parts of water. The resulting precipitated inorganic salts are removed by filtration, and the filtrate is concentrated to dryness under reduced pressure. The resulting oily residue is dissolved in 40 parts of methanol, and 250 parts by volume of 3% hydrochloric acid is added. The resultig acidic mixture is extracted with chloroform, then is made alkaline by the addition of dilute aqueous sodium hydroxide. Extraction of the alkaline mixture with benzene affords an organic solution, which is washed with water, dried over anhydrous sodium sulfate and stripped of solvent by distillation under reduced pressure. Crystallization of the resulting residue from ether results in 2-aza-17α-methyl-5α-androstan-17β-ol, melting at about 166.5–167.5° and represented by the following structural formula

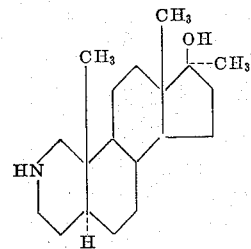

Example 16

By substituting an equivalent quantity of 2-aza-17α-ethyl-17β-hydroxy-5α-androstan-3-one and otherwise proceeding according to the processes described in Example 15, there is obtained 2-aza-17α-ethyl-5α-androstan-17β-ol.

Example 17

To a solution of 5 parts of 2-aza-17β-hydroxy-2-methyl-5α-androstan-3-one in 1000 parts of dioxane is added 10 parts of lithium aluminum hydride, and the resulting reaction mixture is heated in a nitrogen atmosphere at the reflux temperature with stirring for about 24 hours, then is cooled to 0–5° and diluted successively with a solution of 12 parts of water in 15 parts of dioxane, 90 parts by volume of 10% aqueous sodium hydroxide, and 70 parts of water. The inorganic salts which precipitate are removed by filtration, and the filtrate is stripped of solvent by distillation under reduced pressure. The resulting residue is dissolved in 24 parts of methanol, and 150 parts by volume of 3% hydrochloric acid is added to that solution. The resulting acidic mixture is extracted with benzene, then is made alkaline by the addition of aqueous sodium hydroxide. Extraction of this alkaline mixture with benzene affords an organic solution, which is evaporated to dryness. The resulting residual solid is recrystallized from benzene to afford 2-aza-2-methyl-5α-androstan- 17β-ol, melting at about 158–159° and characterized further by the following structural formula

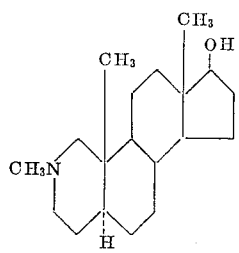

*Example 18*

The substitution of an equivalent quantity of 2-aza-2-ethyl-17β-hydroxy-5α-androstan-3-one in the procedure of Example 17 results in 2-aza-2-ethyl-5α-androstan-17β-ol.

*Example 19*

A mixture of 1.5 parts of 2-aza-17α-methyl-5α-androstan-17β-ol, 10 parts of pyridine, and 5.5 parts of acetic anhydride is stored at room temperature for about 16 hours, then is diluted with water. The resulting aqueous mixture is extracted with chloroform, and the chloroform layer is separated, washed successively with dilute hydrochloric acid, aqueous potassium bicarbonate, and water, then dried over anhydrous sodium sulfate and stripped of solvent under reduced pressure. Crystallization of the resulting residue from benzene affords 2-acetyl-2-aza-17α-methyl-5α-androstan-17β-ol, melting at about 213–214°. It is represented by the following structural formula

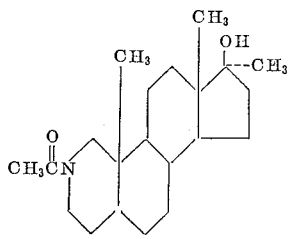

*Example 20*

The substitution of equivalent quantities of 2-aza-17α-ethyl-5α-androstan-17β-ol and propionic anhydride in the procedure of Example 19 affords 2-aza-17α-ethyl-2-propionyl-5α-androstan-17β-ol.

*Example 21*

To a solution of 10 parts of 2-aza-17β-hydroxy-2,17α-dimethyl-5α-androstan-3-one in 2000 parts of dioxane is added 20 parts of lithium aluminum hydride, and the resulting reaction mixture is heated at the reflux temperature with stirring, under nitrogen, for about 24 hours. Cooling of the reaction mixture to 0–5° followed by successive dilution with a solution of 25 parts of water in 25 parts of dioxane, 17 parts by volume of 10% aqueous sodium hydroxide, and 70 parts of water results in precipitation of the inorganic salts which are removed by filtration. The filtrate is concentrated to dryness, and the resulting residue is dissolved in 48 parts of methanol, and 300 parts by volume of 3% aqueous hydrochloric acid is added. The resulting cloudy mixture is extracted with chloroform, then is made alkaline by the addition of aqueous sodium hydroxide. Extraction with benzene affords an organic solution which is washed with water, dried over anhydrous sodium sulfate, and concentrated to dryness under reduced pressure. Recrystallization of the resulting residue first from isopropyl alcohol, then from benzenehexane affords pure 2-aza-2,17α-dimethyl-5α-androstan-17β-ol, melting at about 118–119.5°. This compound can be represented by the following structural formula

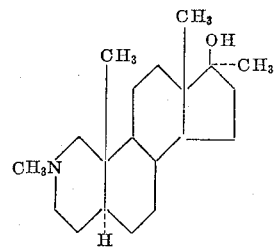

*Example 22*

By substituting an equivalent quantity of 2-aza-2,17α-diethyl-17β-hydroxy-5α-androstan-3-one and otherwise proceeding according to the processes described in Example 21, there is obtained 2-aza-2,17α-diethyl-5α-androstan-17β-ol.

*Example 23*

The substitution of an equivalent quantity of 2-aza-2-methyl-5α-androstan-17β-ol in the procedure of Example 13 results in 2-aza-2-methyl-5α-androstan-17β-ol 17-acetate.

What is claimed is:
1. A compound of the formula

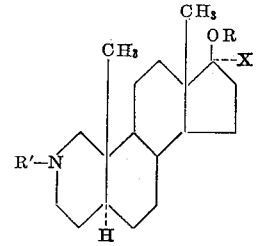

wherein X is selected from the group consisting of hydrogen and lower alkyl, R' is a member of the class consisting of hydrogen, lower alkyl, and lower alkanoyl, R is hydrogen when X is lower alkyl, and R is selected from the group consisting of hydrogen and lower alkanoyl when X is hydrogen.
2. 2-aza-5α-androstan-17β-ol.
3. A compound of the formula

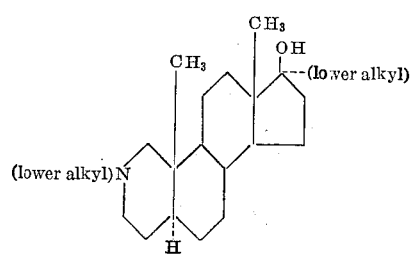

4. 2-aza-2,17α-dimethyl-5α-androstan-17β-ol.
5. A compound of the formula
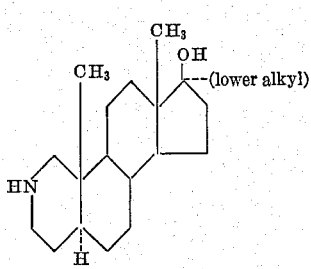
6. 2-aza-17α-methyl-5α-androstan-17β-ol.
7. A compound of the formula
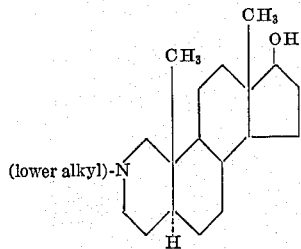
8. 2-aza-2-methyl-5α-androstan-17β-ol.
9. A compound of the formula
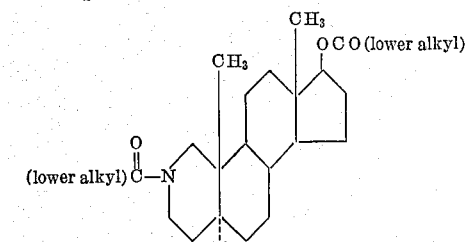
10. 2-acetyl-2-aza-5α-androstan-17β-ol 17-acetate.
11. A compound of the formula
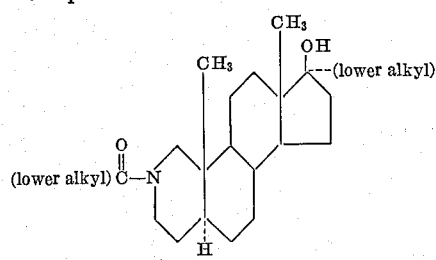
12. 2-acetyl-2-aza-17α-methyl-5α-androstan-17β-ol.
No references cited.
ALEX MAZEL, *Primary Examiner.*
HENRY R. JILES, DONALD G. DAUS,
*Assistant Examiners.*